US012393506B2

(12) United States Patent
Fuksbrumer et al.

(10) Patent No.: US 12,393,506 B2
(45) Date of Patent: Aug. 19, 2025

(54) VALIDATION OF SYSTEM FUNCTIONALITY SUBSEQUENT TO MODIFICATION USING PARALLEL REGRESSION TESTING

(71) Applicant: Chicago Mercantile Exchange Inc., Chicago, IL (US)

(72) Inventors: Kfir Fuksbrumer, Rishon-LeZion (IL); Haya Miller, Petah-Tikva (IL); Avigail Gofman, Rishon-LeZion (IL); Ariel Weill, Yakir (IL); Arkady Mishiev, Ramat Gan (IL); Ifat Berenstein, Hod Hasharon (IL)

(73) Assignee: Chicago Mercantile Exchange Inc., Chicago, IL (US)

( * ) Notice: Subject to any disclaimer, the term of this patent is extended or adjusted under 35 U.S.C. 154(b) by 295 days.

(21) Appl. No.: 16/715,320

(22) Filed: Dec. 16, 2019

(65) Prior Publication Data
US 2021/0182247 A1    Jun. 17, 2021

(51) Int. Cl.
*G06F 11/3668* (2025.01)
*G06F 11/3698* (2025.01)

(52) U.S. Cl.
CPC ...... *G06F 11/3688* (2013.01); *G06F 11/3684* (2013.01); *G06F 11/3692* (2013.01); *G06F 11/3698* (2025.01)

(58) Field of Classification Search
CPC .............. G06F 11/36–3696; G06F 8/60–66
See application file for complete search history.

(56) References Cited

U.S. PATENT DOCUMENTS

| | | | |
|---|---|---|---|
| 9,836,388 B1 | 12/2017 | Moniz et al. | |
| 10,146,666 B1 * | 12/2018 | Beales | G06F 11/34 |
| 11,093,379 B2 * | 8/2021 | Duffy | G06F 11/3684 |

(Continued)

OTHER PUBLICATIONS

"Financial Message Automation", Volante, 2019, https://www.volantetech.com/financial-messages.

(Continued)

*Primary Examiner* — Todd Aguilera
(74) *Attorney, Agent, or Firm* — Lempia Summerfield Katz LLC (57) ABSTRACT

The disclosed embodiments relate to validation of prior system functionality subsequent to modification using parallel regression testing of the old, pre-modified system and new, modified system, based on the processing of a set of previously processed inputs known to have produced valid results. More particularly, the disclosed embodiments provide a system/method for validating a modified transaction processing system to determine whether the modification thereto altered unmodified and previously operational functionality by selecting a set of transactions, previously processed by the unmodified system and known to have produced acceptable results, process them using test instances of both the unmodified and modified versions of the system, and compare the results to determine any differences, aside from those which are expected as a result of the modification. Unexpected differences may be indicative of the modification compromising previously operational functionality of the system which was not intended to be modified.

25 Claims, 7 Drawing Sheets

(56) References Cited

U.S. PATENT DOCUMENTS

| | | | |
|---|---|---|---|
| 2007/0006041 A1* | 1/2007 | Brunswig | G06F 11/3688 |
| | | | 714/38.14 |
| 2009/0018866 A1 | 1/2009 | Christen | |
| 2014/0053134 A1* | 2/2014 | Wiggers | G06F 11/3608 |
| | | | 717/124 |
| 2016/0062765 A1* | 3/2016 | Ji | G06F 8/75 |
| | | | 717/122 |
| 2019/0012161 A1* | 1/2019 | Miernik | G06F 8/65 |
| 2021/0026761 A1* | 1/2021 | Duffy | G06F 11/3684 |

OTHER PUBLICATIONS

Volante Designer, "Simplifying Complexity in Financial Message and Data Intergration", Volante, 2019, 4 pages.

Extended European Search Report, from EP Application No. 20213105, May 7, 2021, EP.

Israel Examination Report from Israel Patent Application No. 279449, May 21, 2023, IL.

European Examination Report from EP Application No. 20 213 105.8, dated Feb. 17, 2025.

\* cited by examiner

ID: I67b94uxhrj0

TOTAL
10000
Repository Messages

9999
First Transformed Topic

9999
Second Transformed Topic

1
First Transformed Error Topic

1
Second Transformed Error Topic

COMPARISON

4991
Identical

5008
Match by Key

0
Unique First Transformer

0
Unique Second Transformer

0
Internal First Transformer Error

0
Internal Second Transformer Error

ERROR REASON

| TRANSFORMER SETTING – GENERIC TRANSFORMER SETTING | | |
|---|---|---|
| Field Name | Type | Path |
| Mask all elements in Array | MASK | content.fx_block_and_allocations.tra |
| Mask First element in Array | MASK | content.fx_block_and_allocations.tra |
| transformation_published | MASK | metadata.transformation_published |
| transformation_captured | MASK | metadata.transformation_captured |
| kafka_key | MASK | metadata.kafka_key |
| In Message Id | KEY | metadata.in_message_id |

FIG. 6B

VALIDATION OF SYSTEM FUNCTIONALITY SUBSEQUENT TO MODIFICATION USING PARALLEL REGRESSION TESTING

BACKGROUND

Computer software-based systems, such as transaction processing systems, take time to develop and test to assure that they function as intended. Periodically, such systems need to be modified or updated to be able to fix known problems, process new or modified inputs and/or to implement new or modified functionality. However, the complexity of such systems results in a high probability that such modifications or updates will cause existing functionality, which was operating correctly prior to the modification or update and not intended to be altered thereby, to fail. As software is updated or changed, emergence of new faults and/or re-emergence of old faults is quite common. Often, a fix for a problem will be "fragile" in that it fixes the problem in the narrow case where it was first observed but not in more general cases which may arise over the lifetime of the software. Frequently, a fix for a problem in one area inadvertently causes a software bug in another area. Finally, it may happen that, when some feature is redesigned, some of the same mistakes that were made in the original implementation of the feature are made in the redesign. For any system, and particularly mission critical systems, such unintended failures result in extended system downtime, increased costs, etc., necessary to identify and fix what was broken.

Accordingly, software developers deploy extensive testing to ensure that modifications or updates to existing software systems not only correctly implement the desired corrective/new/modified functionality but, further, do not break previously operating functionality that was not intended to be altered.

One form of such testing is regression testing which involves re-running functional and non-functional tests to ensure that previously developed and tested software still performs after a change. Regression testing typically involves running a large number of tests, referred to as a test suite, to which new tests are added as new problems are discovered that the existing tests failed to catch. Regression testing may be performed manually but is often automated. Generally, each test programmatically specifies parameters, functions or operations to be performed/tested as well as the expected results of the correct performance of the test. The regressions testing system performs each test and compares the actual results with the specified expected results and identifies when there is a deviation therebetween.

Regression testing is resource intensive, time consuming and expensive, depending on the number of tests to be run, and the required degree of certainty in having exhaustively tested the system. Further, such testing is highly technical, requiring significant skill to identify software defects, design tests to identify those defects, run those tests along with all of the other tests, review the test results, correct the problems, and repeat to re-test. This can lead to significant system down-time for an existing system and/or significant delays in deployment of a system update.

DETAILED DESCRIPTION

The disclosed embodiments relate to validation of prior system functionality subsequent to modification using parallel regression testing of the old, pre-modified system and new, modified system, based on the processing of a set of previously processed inputs known to have produced valid results. More particularly, the disclosed embodiments provide a system/method for validating a modified transaction processing system to determine whether the modification thereto altered unmodified and previously operational functionality. The disclosed embodiments select a set of transactions which were previously processed by the unmodified system, and known to have produced acceptable results, and process them using test instances of both the unmodified and modified versions of the system. The results are then compared to determine if there are any differences, aside from those differences which are expected as a result of the modification. Any unexpected differences may then be indicative of the modification compromising previously operational functionality of the system which was not intended to be modified.

The disclosed embodiments eliminate the need to generate tests in advance and determine the expected/acceptable results thereof. For complex systems under test which require a high volume of tests in order to ensure correct operation, the disclosed embodiments save significant test development time and resources. Furthermore, by automatically selecting the prior transactions with which to test the system, as will be described, the disclosed embodiments reduce the skill level needed to run regression testing on the system under test.

An example transaction processing system which may be tested and validated using the disclosed embodiments is the post-trade processing infrastructure provided by Traiana Inc., a part of CME Group Inc. This infrastructure automates post-trade processing workflows including messaging and matching, allocations and confirmations. This system further manages clearing, settlement and pre- and post-trade credit risk. The system includes a secure, cloud-based network, which enables messaging with global market participants regardless of their preferred message format. The system serves banks, brokers, prime/executing/clearing brokers, asset managers, hedge funds, pension funds, fund administrators and trading venues and covers post-trade processing of key equities, FX, credit, fixed income and commodities markets and support for cash, OTC derivative, exchange-traded derivative and repo instruments.

One feature of this example system is the centralization and normalization of inter-party messaging for communicating trade execution notifications, trading instructions/ orders, and reporting, for execution/trade processing, settlement, confirmation, reconciliation and clearing.

Figure 1:
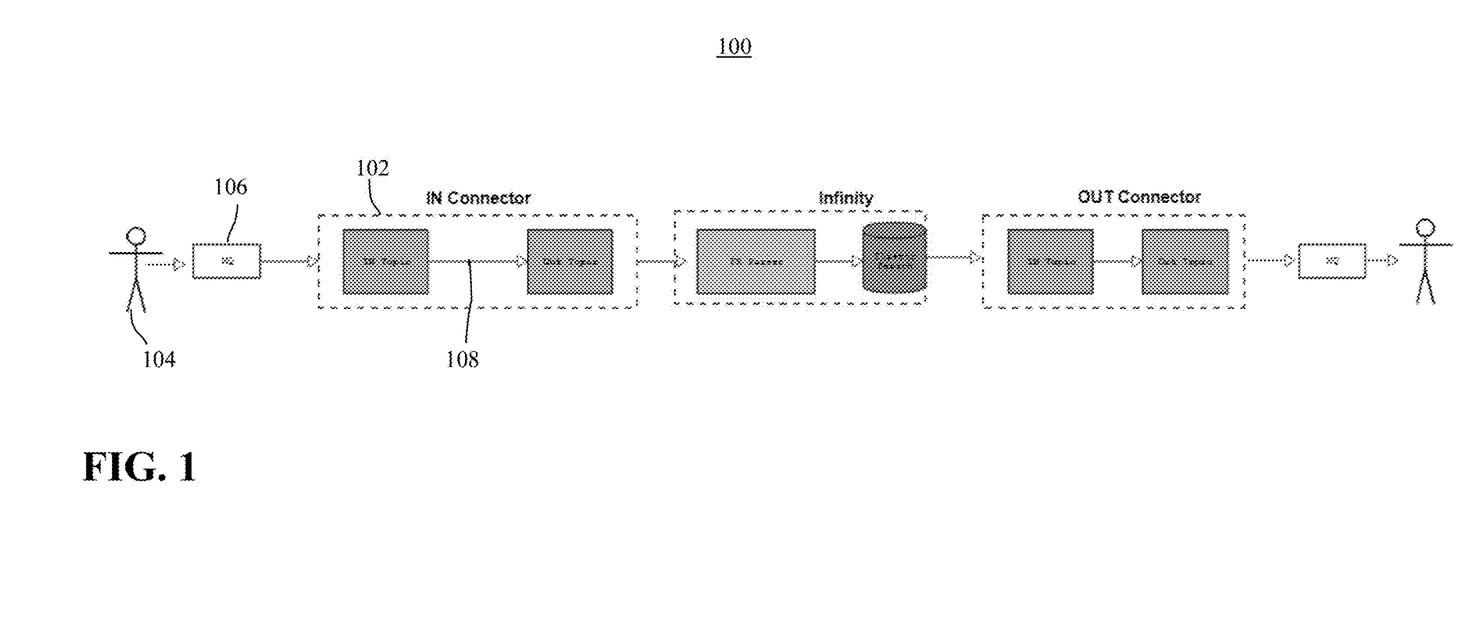
FIG. 1 depicts an illustrative system which may be tested with the disclosed embodiments.

FIG. 1 shows a high-level block diagram of the Traiana system 100. This system 100 includes a plurality of IN Connectors 102 which receive transactions/messages, in any format specified by the client, from clients/sources 104, via a message gateway 106, and converts those received transactions/messages to a normalized format, such as ProtoBuf, a data serialization protocol promulgated by Google Inc. The converted transactions/messages are then forwarded to the rest of the Traiana system for subsequent processing. The IN Connector 102 generally implements a converter 108, referred to as a cartridge or transformer 108, which converts/transforms incoming messages/transactions in a specific format to the normalized format. In one embodiment, there may be an IN Connector 102 for each client and for each type of message/transaction that the client may send to the system. In one embodiment, the IN Connector 102 utilizes instances of cartridges/transformers implemented by Volante Designer, manufactured by Volante Technologies Inc.

Clients may send transactions/messages to the system 100 in a myriad of formats/protocols including the protocol/format of transmission and/or the protocol/format of the message and/or the content thereof, including different types of data, the format of the data, the arrangement/order of the data within the message, etc. These formats/protocols include, but are not limited to, FIX, XML, text, csv, HTML, Microsoft Excel®, e-mail, etc., in addition to any client specified data types and/or arrangements used in conjunction therewith. It will be appreciated that a particular protocol may specify a content structure for any message content that is included but allows for that message content and the arrangement thereof to be arbitrary. For example, a CSV message format may require that distinct data included in a message be separated by commas but does not otherwise specify what that data is or on what arrangement. E.g. a CSV message from one client may include, an order, price, date (month, day, 4-digit-year), product identifier, buyer identifier and seller identifiers. Another CSV formatted message from another client may include, an order, product identifier, buyer identifier, date (day, month, 2-digit-year), seller identifier and price. Accordingly, a given message format utilized by a client may combine the requirements for a specific protocol structure/format with arbitrary client-custom variations for those aspects of the message format left undefined by the specific protocol/structure.

The system 100 utilizes a specification of the particular protocol/format of each client's messages in order to convert/transform all incoming messages into the normalized format. As the messages' formats/protocols are complex, specifying numerous data fields, types, etc., the specifications used to convert/transform them are equally complex and ensuring that the system 100 correctly converts/transforms messages, using those specifications, requires significant testing. Occasionally, a client will change their particular message format/protocol. For example, a client may switch from a day-month-year date format to a month-day-year format. In such a situation, the conversion/transformation specification must be modified to correctly convert date data in the new format into the normalized format.

However, given the complexity of the conversion/transformation specification, along with the need to minimize downtime, modifications to conversion/transformation specifications, which were functioning correctly prior to the modification, need to be rigorously tested not only to ensure that the modification was correctly implemented but also that unmodified functionality was not affected. For example, if the client altered the format of their date data, it is important to ensure that the modified specification does not affect the conversion of price data, the incoming data format of which was not changed, to the normalized format.

The disclosed embodiments represent a technical solution to a technical problem of testing complex software systems, such as transaction processing systems, which are too complex to manually review. In particular, the number of permutations of inputs, e.g. test scenarios, required to sufficiently validate a complex system may be too large to manually create and/or execute. Furthermore, when a system is modified, new tests must be developed to test the new/modified functionality and old tests which were previously used to test that functionality must be identified and discarded. Furthermore, the unmodified functionality must be tested to ensure that it was not unintentionally altered by the modification. This must all be done with minimal system downtime and with minimal resources.

Accordingly, the disclosed embodiments further provide a practical application for testing complex systems which provides a specific process by which previously successfully processed transactions/messages are re-processed in a test environment in which the prior unmodified system is deployed in parallel with the modified system and both systems process the transactions. The results are then compared to identify any unexpected differences which would indicate an unintended modification of prior functionality. This practical application avoids the need to specifically develop tests in advance of testing, as it uses historical, actual previously processed transactions, or determines, in advance, the results to be expected from successful execution thereof, as the system generates those expected results using the unmodified system relative to the testing of the modified system.

In some cases, more than one client may use the same format/protocol for sending their messages, such as Swift, FIX and/or FpML, including not only the same protocol and field arrangement, etc., but the same data types and formats as well. In such cases, additional resource savings may be obtained by the disclosed embodiments by being able test modifications to a single transformer/converter 108, e.g. cartridge, as described herein, which may be used in multiple different IN connectors 102, e.g., for each of these clients.

It will be appreciated that while the disclosed embodiments will be discussed with respect to testing a modified system which was modified to process a new/updated input format, the disclosed embodiments may also be used to test a modified system which was modified for other reasons, such as to correct an identified defect in the system, and/or produce a new or updated output format.

Herein, the phrase "coupled with" is defined to mean directly connected to or indirectly connected through one or more intermediate components. Such intermediate components may include both hardware- and software-based components. Further, to clarify the use in the pending claims and to hereby provide notice to the public, the phrases "at least one of <A>, <B>, . . . and <N>" or "at least one of <A>, <B>, . . . , <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, or N including any one element alone or in combination with one or more of the other elements which may also include, in combination, additional elements not listed.

Figure 2:
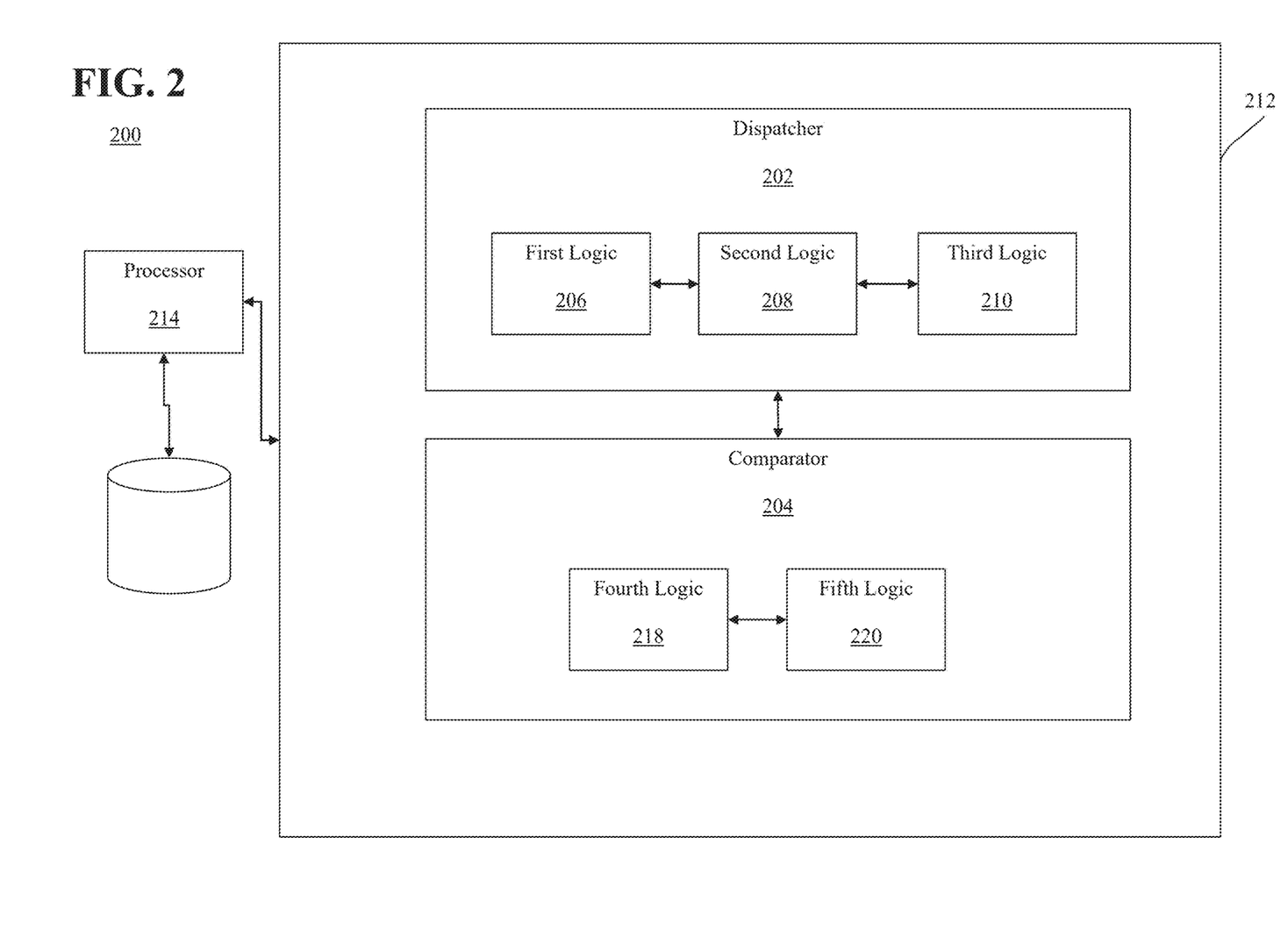
FIG. 2 depicts a block diagram of a system according to one embodiment.

FIG. 2 depicts a block diagram of a system 200, which may also be referred to as an architecture, for use with the computer implemented transaction processing system 100 of FIG. 1, for validating a modified version of, for example, the computer implemented transaction processing system 100 depicted in FIG. 1, wherein the transaction processing system, for example, comprises a transaction processor 108, e.g. a cartridge/transformer, operative to process a plurality of incoming transactions and, for each of the plurality of incoming transactions, generate a processed output.

The system 200 includes a regression dispatcher 202 and a comparator 204 coupled therewith which may be implemented as one or more logic components such as on an FPGA which may include a memory or reconfigurable component to store logic and a processing component to execute the stored logic.

In particular, the regression dispatcher 202 is configured, or may be implemented by one or more logic components such as first, second and third logic components 206, 208, 210, stored in a memory 212 and executable by a processor 214 to cause the processor 214, to deploy or otherwise instantiate, such as into a software test system/environment (not shown), an instance of a first version of the transaction processor 108A comprising the transaction processor 108 prior to a modification, which may be referred to as the production version, deploy/instantiate, into the test system, an instance of a second version of the transaction processor 108B comprising the transaction processor 108 as modified by the modification, which may be referred to as the test version, and automatically select a subset of a plurality of transactions stored in a database 216 which stores a plurality of transactions previously processed by the first version of the transaction processing system. The database 216 may be coupled with the then current production version of the transaction processor 108 and stores copies of all, or a subset of, incoming transactions/messages to the transaction processing system 100. This database 216 may be part of a general recordkeeping or archival system or may be specifically implemented for use with disclosed embodiments.

The comparator 204 is coupled with the regression dispatcher 201 and is configured, or otherwise may be implemented by one or more logic components such as fourth logic component 218, stored in the memory 212 and executable by the processor 214 to cause the processor 214, to, for each transaction of the selected subset: cause, automatically, the instance of the first version of the transaction processor 108A to process the transaction and generate, based thereon, a first processed output; cause, automatically, the instance of the second version of the transaction processor 108B to process the transaction and, based thereon, generate a second processed output; compare, automatically, the first processed output to the second processed output to identify any differences therebetween; and present, or otherwise output an indication, such as a report, such as on a display (not shown) coupled with the processor 214 or to a data file, data indicative of the identified differences.

In one embodiment, the transaction processor 108 is one of a plurality of transaction processors 108, each of which is operative to process a specific subset, e.g., characterized as being from a particular source/client and/or having a particular type/content/format, of the plurality of incoming transactions, and which has processed a specific subset of the previously processed plurality of transactions stored in the database 216 as described, and wherein the regression dispatcher/third logic 210 is further executable by the processor 214 to cause the processor 214 to select at least a portion of the specific subset of the previously processed plurality of transactions stored in the database 216 processed by the particular transaction processor 108.

In one embodiment, the comparator 204 is further operative, such as via fifth logic 220 which is stored in the memory 212 and executable by the processor 214 to cause the processor 214, to receive, such as from a test operator, a specification, which may be referred to as a key file, of expected differences between outputs of the first and second versions of the transaction processing system 108A 108B based on the modification, and wherein the comparator 204/fourth logic 218 is further executable by the processor 214 to cause the processor 214 to ignore, based on the specification, any expected differences between the first and second processed outputs. The specification may be defined based on differences between a prior and new message format or between a prior and new output format. It will be appreciated that the comparator 204 may ignore, e.g. not report, such expected differences, or otherwise mask, hide or otherwise deprecate indications thereof. In one embodiment, unexpected differences may be highlighted or otherwise readily identified where expected differences are not presented in the same manner. In one embodiment, the specification may identify one or more specific data fields in the incoming transactions for which differences in the processed outputs are expected. Alternatively, or in addition thereto, the specification may identify one or more specific differences which are expected. In one embodiment, the system indicates when no expected changes, as specified in the specification, are detected.

In one embodiment, the specification of expected differences, e.g. key file, may be generated using a graphic user interface, or other tool, presented to the user, e.g. test operator. The interface/tool may present a visualization of the message format, such as a field list which may indicate data types, etc., and allow the user to select those fields for which differences are expected and/or otherwise defined the nature of the expected differences. In one embodiment, the tool may present a visualization of both the current and modified messages formats, such as in a side by side or differential format to assist the user to identify expected differences. Once a specification/key file is defined, it may be saved and reused in future tests as described herein.

In one embodiment, the comparator 204 is further operative, e.g. the fourth logic 218 is further executable by the processor 214 to cause the processor 214, to automatically determine that the modification did not alter previously operational functionality of the transaction processing system when no non-ignored differences are identified.

In one embodiment, the comparator 204 is further operative, such as via fifth logic 220 which is stored in the memory 212 and executable by the processor 214 to cause the processor 214, to receive a specification of the previously operational functionality of the transaction processing system to test and wherein the third logic is further executable by the processor 214 to cause the processor 214 to select the subset of the plurality of transactions stored in the database 216 based thereon.

In one embodiment, the comparator 204 is further operative, e.g. the fourth logic 218 is further executable by the processor 214 to cause the processor 214, to cause the instances of the first and second versions of the transaction processor 108A 108B to process all of the selected subset of the plurality of transactions and to generate an aggregate of the first and second processed outputs and store the aggregate first and second processed outputs in the memory coupled with the processor, the comparing further comprising retrieving the stored aggregate first and second processed outputs and subsequently comparing the aggregate first processed output to the aggregate second processed output to identify any differences therebetween.

In one embodiment, the comparator 204 is further operative, e.g. the fourth logic 218 is further executable by the processor 214 to cause the processor 214, to cause the first and second versions of the transaction processor 108A 108B to substantially contemporaneously, i.e. in parallel, process the transaction, e.g. each of the instances of the first and second versions of the transaction processor 108A 108B are independently instantiated/executed and each processes incoming transactions upon receipt to produce their respective output. Alternatively, the first and second versions of the transaction processor 108A 108B are serially instantiated/executed and one processes incoming transactions upon receipt to produce its respective output prior to the other processing that transaction and producing its respective output.

In one embodiment, each of the plurality of incoming transactions comprises a data object containing data in a first format, the transaction processor 108 operative to process the data object to convert the data therein from the first format to a second format based on a specification. In one embodiment, the first format comprises one of a data file, text, email message, spreadsheet, csv, html, or xml. In one embodiment, the second format comprises protobuf. In one embodiment, the first and second formats define one of data fields, data types, or data format (type, order or format of one or more data items) of the data of the data object.

In one embodiment, the modification comprises a modification to the specification to cause the transaction processing system 108 to convert the data therein from the first format to a third format different from the second format.

In one embodiment, the modification comprises a modification to the specification to cause the transaction processing system to convert the data therein from a third format, different from the first format, to the second format.

In one embodiment, the identified differences are presented within a context of similarities between the first and second processed outputs. For example, in one embodiment, the identified differences are highlighted in the presentation.

Figure 3:
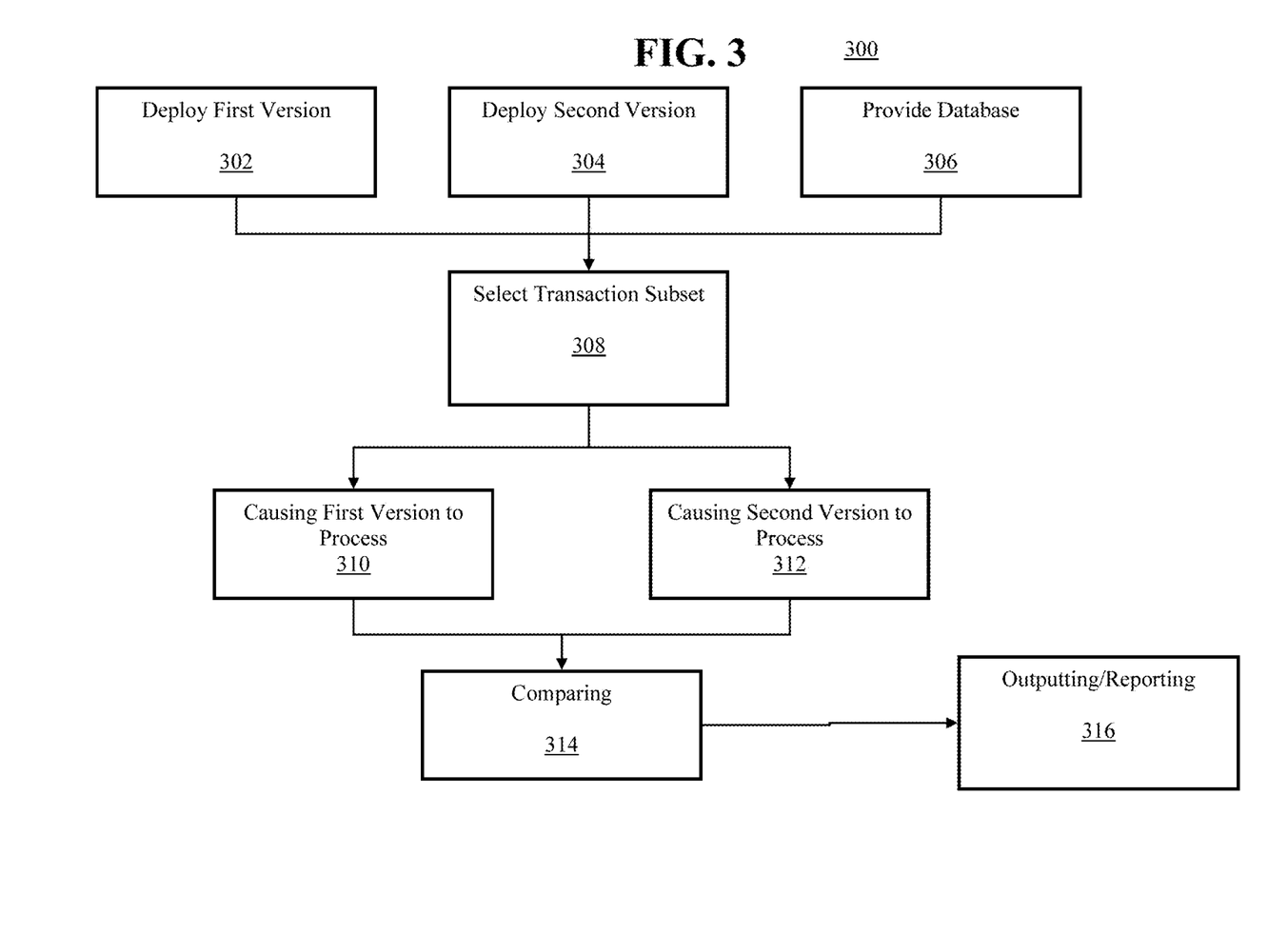
FIG. 3 depicts a flow chart showing operation of the system of FIG. 2 according to one embodiment.

FIG. 3 depicts a flow chart 300 showing operation of the system 200 of FIG. 2. In particular FIG. 3 shows a computer implemented method for validating a modified computer implemented transaction processing system 100, wherein the transaction processing system 100 comprises a transaction processor 108 (cartridge/transformer) operative to process a plurality of incoming transactions and, for each of the plurality of incoming transactions, generates a processed output. The operation of the system 200 includes deploying, by a processor 214 into a test system (environment), a first version of the transaction processor 108A comprising the transaction processor 108 prior to a modification (current/production) (Block 302); deploying, by the processor 214 into the test system, a second version of the transaction processor 108B comprising the transaction processor 108 as modified by the modification (test) (Block 304); providing, or otherwise accessing, a database 216 coupled with the processor 214 and which stores a plurality of transactions previously processed by the first version of the transaction processing system 108A (Block 306); selecting, automatically by the processor 214, a subset of the plurality of transactions stored in the database 216 (Block 308; for each transaction of the selected subset: causing, automatically by the processor 214 the first version of the transaction processor 108A to process the transaction and generate, based thereon, a first processed output (Block 310); causing, automatically by the processor 214, the second version of the transaction processor 108B to process the transaction and, based thereon, generate a second processed output (Block 312); comparing, automatically by the processor 214, the first processed output to the second processed output to identify any differences therebetween (Block 314); and presenting (outputting, e.g. data or a report), by the processor 214 on a display coupled therewith, data indicative of the identified differences (Block 316).

In one embodiment, wherein the transaction processor 108 is one of a plurality of transaction processors 108, each of which is operative to process a specific subset (characterized by source/client and/or type/content/format) of the plurality of incoming transactions, and which has processed a specific subset of the previously processed plurality of transactions stored in the database, the operation of the system 200 further includes selecting at least a portion of the specific subset of the previously processed plurality of transactions stored in the database processed by the transaction processor 108.

In one embodiment, the operation of the system 200 further includes providing a specification (key file) of expected differences between outputs of the first and second versions of the transaction processing system based on the modification, and wherein the comparing is further operative to ignore, or otherwise, mask, hide or remove, based on the specification, any expected differences between the first and second processed outputs.

In one embodiment, the operation of the system 200 further includes determining, automatically by the processor 214, that the modification did not alter previously operational functionality of the transaction processing system when no non-ignored differences are identified.

In one embodiment, the operation of the system 200 further includes providing a specification of the previously operational functionality of the transaction processing system to test and wherein the selecting of the subset of the plurality of transactions stored in the database is based thereon.

In one embodiment, the processing of the transaction by the first and second versions of the transaction processor 108A 108B is performed for all of the selected subset of the plurality of transactions to generate an aggregate of the first and second processed outputs and store the aggregate first and second processed outputs in a memory coupled with the processor 214, the comparing further comprising retrieving the stored aggregate first and second processed outputs and subsequently comparing the aggregate first processed output to the aggregate second processed output to identify any differences therebetween.

In one embodiment, the causing of the first version of the transaction processor 108A to process the transaction and generate, based thereon, a first processed output occurs substantially contemporaneously, e.g. in parallel, with the causing of the second version of the transaction processor 108B to process the transaction and, based thereon, generate a second processed output. Alternatively, the first and second versions of the transaction processors 108A 108B may process the transactions serially.

In one embodiment, each of the plurality of incoming transactions comprises a data object containing data in a first format, the transaction processor 108 operative to process the data object to convert the data therein from the first format to a second format based on a specification. In one embodiment, the first format comprises one of a data file, text, email message, spreadsheet, csv, html, or xml. In one embodiment, the second format comprises protobuf. In one embodiment, the first and second formats define one of data fields, data types, or data format (type, order or format of one or more data items) of the data of the data object.

In one embodiment, the modification comprises a modification to the specification to cause the transaction processing system 108 to convert the data therein from the first format to a third format different from the second format.

In one embodiment, the modification comprises a modification to the specification to cause the transaction processing system to convert the data therein from a third format, different from the first format, to the second format.

In one embodiment, the identified differences are presented within a context of similarities between the first and second processed outputs. For example, in one embodiment, the identified differences are highlighted in the presentation.

Figure 5:
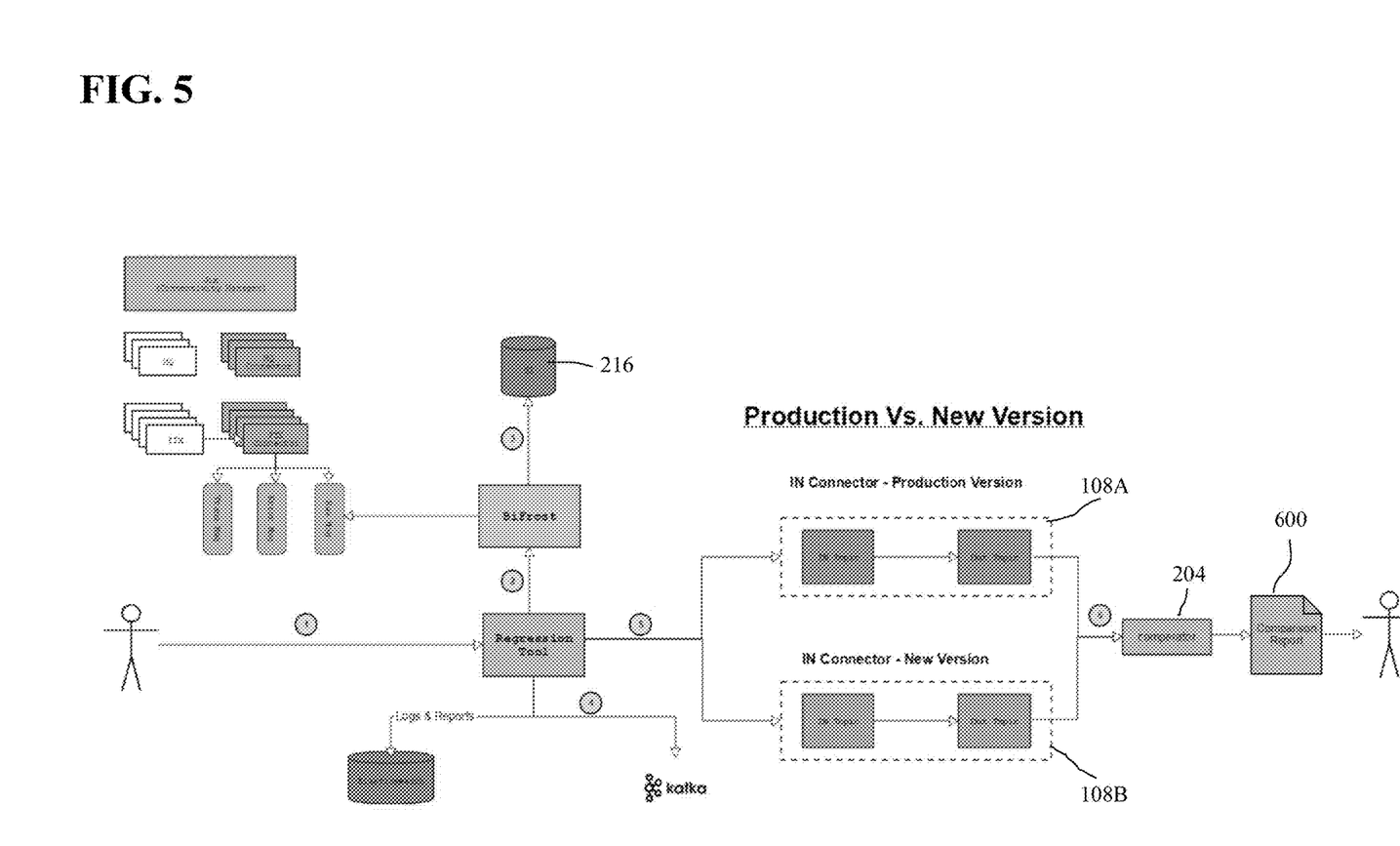
FIG. 5 depicts a block diagram of an exemplary implementation of the system of FIG. 2 according to one embodiment.
Figure 6A:
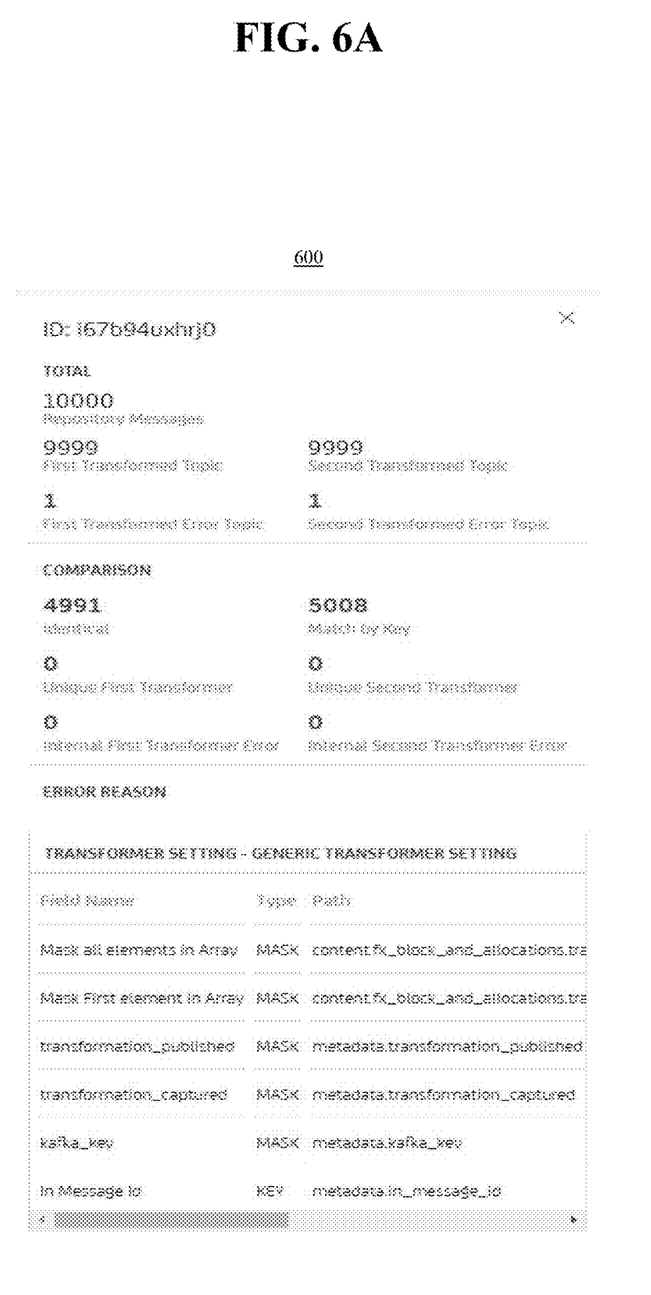
FIGS. 6A and 6B depict examples of the input settings and output of the system of FIG. 2.
Figure 6B:
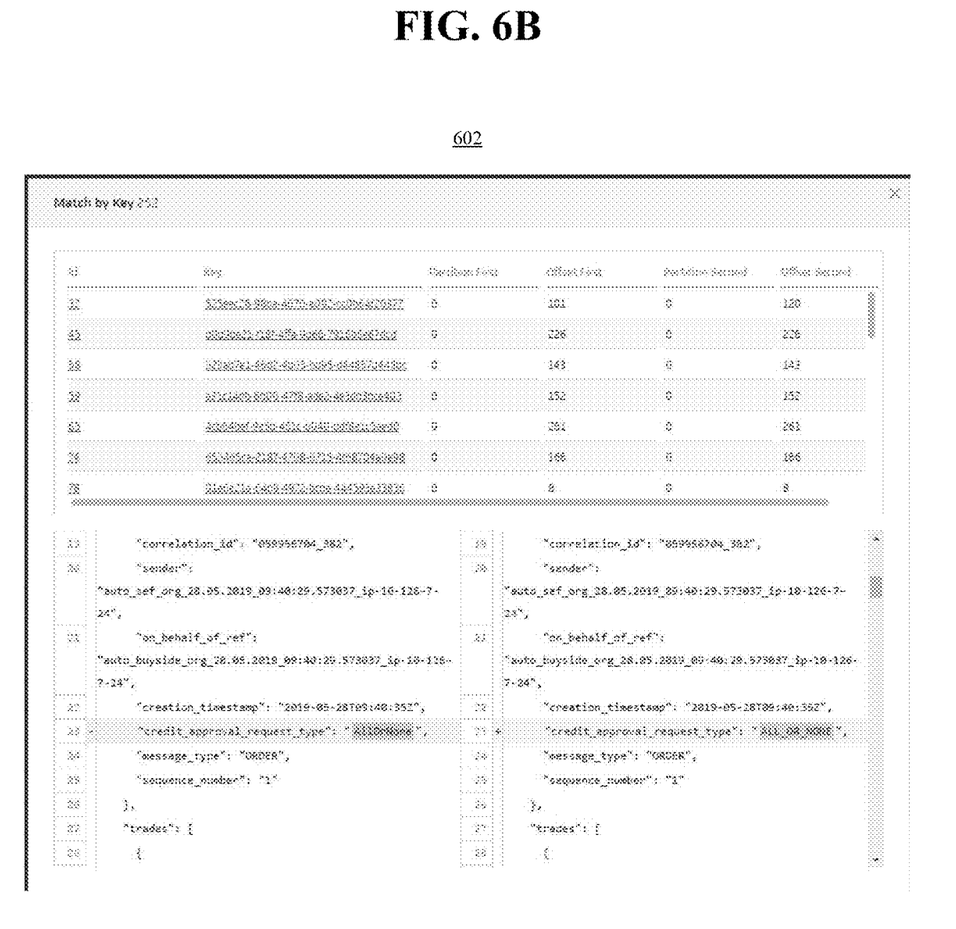

FIG. 5 shows an example implementation of the system 200 of FIG. 2. FIGS. 6A and 6B show examples of output reports 600 602 of the comparator 204 depicting an identified unexpected result 602 according to one embodiment. FIG. 6A shows a summary report of the results of the testing, according to the disclosed embodiments, along with the input parameters used to control the system 200, e.g. a list of which fields were masked and which field for which differences were expected. FIG. 6B shows a detailed report of a specific transaction showing a highlighted difference identified by the disclosed embodiments.

In one implementation, the system 200 is implemented using a micro-services architecture hosted by Amazon Web Services® ("AWS"), a cloud-based computing service provided by Amazon Web Services, Inc., a subsidiary of Amazon.com, Inc. Services, such as those which implement the regression dispatcher 202 and comparator 204, are deployed in Kubernetes, a portable, extensible, open-source platform for managing, automating deployment and scaling containerized applications/workloads and services, that facilitates both declarative configuration and automation. Communication between the services is accomplished using a Representational State Transfer Application Program Interface ("REST API") or g Remote Procedure Call ("gRPC") or via Kafka, a stream processing platform, topics. In operation, according to one embodiment, a user, e.g., test operator, requests to compare two different cartridges/transformers 108A 108B, such as a production version, e.g., v1.0, and a modified version, e.g., v2.0. Responsive thereto, the regression dispatcher 202 deploys two dedicated IN connections 102, each with one of the requested transformers 108A 108B, in Kubernetes wherein the IN connectors are services. Once the testing is completed, the deployed IN connectors 102 are destroyed.

One skilled in the art will appreciate that one or more functions/modules described herein may be implemented using, among other things, a logic component such as a reconfigurable logic component, e.g. an FPGA, which may include a logical processing portion coupled with a memory portion, or as a tangible computer-readable medium comprising computer-executable instructions (e.g., executable software code) executable by a processor coupled therewith to implement the function(s). Alternatively, functions/modules may be implemented as software code, firmware code, hardware, and/or a combination of the aforementioned.

Figure 4:
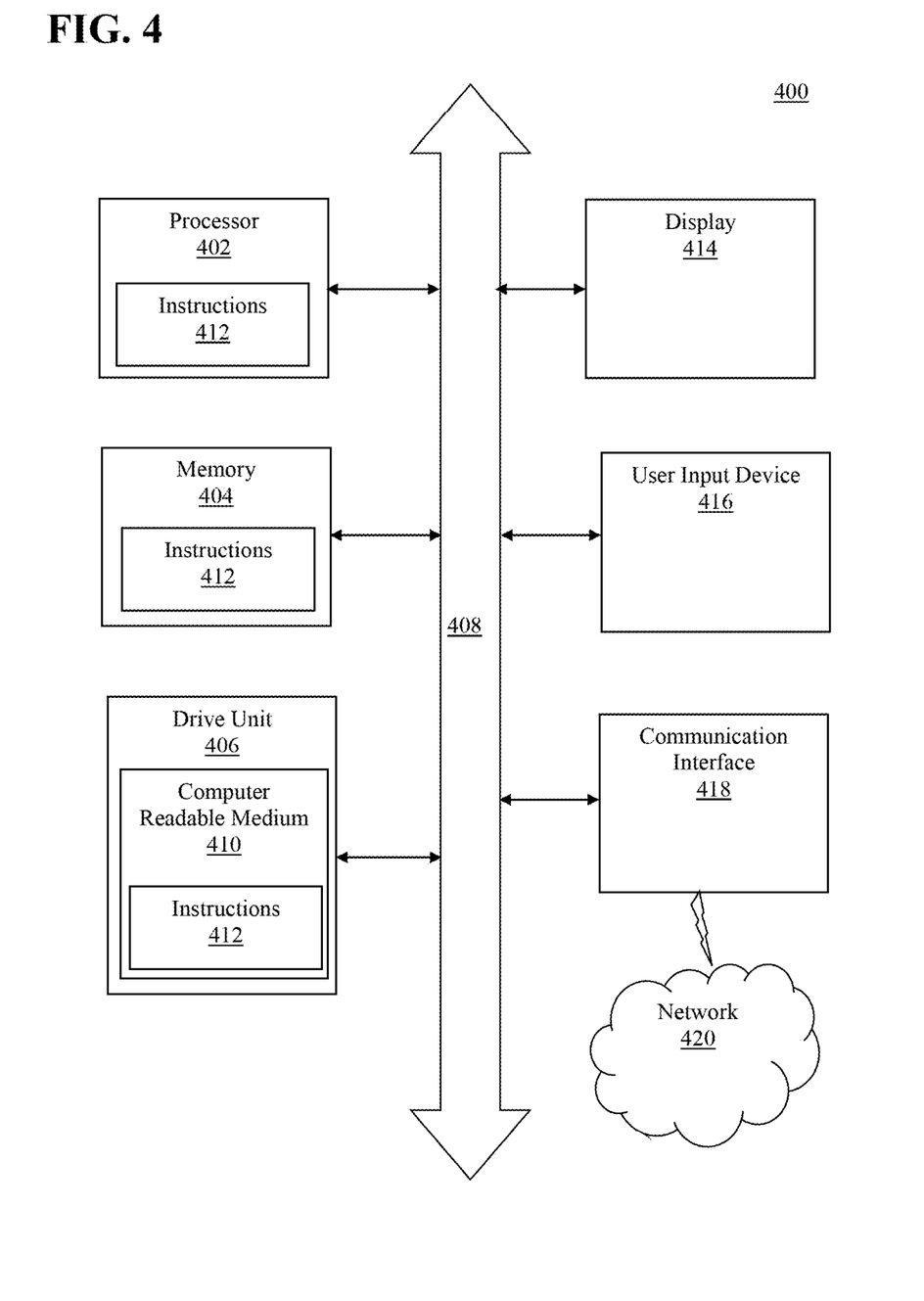
FIG. 4 shows an illustrative embodiment of a general computer system for use with the system of FIGS. 2 and 3.

Referring to FIG. 4, an illustrative embodiment of a general computer system 400 is shown. The computer system 400 can include a set of instructions that can be executed to cause the computer system 400 to perform any one or more of the methods or computer-based functions disclosed herein. The computer system 400 may operate as a standalone device or may be connected, e.g., using a network, to other computer systems or peripheral devices. Any of the components of the electronic trading system 100 discussed above may be a computer system 400 or a component in the computer system 400. The computer system 400 may implement a match engine, margin processing, payment or clearing function on behalf of an exchange, such as the Chicago Mercantile Exchange, of which the disclosed embodiments are a component thereof.

In a networked deployment, the computer system 400 may operate in the capacity of a server or as a client user computer in a client-server user network environment, as a peer computer system in a peer-to-peer (or distributed) network environment, or as a network device such as a switch, gateway or router. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more micro-processors or general purpose processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

As used herein, the terms "microprocessor" or "general-purpose processor" ("GPP") may refer to a hardware device that fetches instructions and data from a memory or storage device and executes those instructions (for example, an Intel® Xeon® processor or an AMD Opteron™ processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" will refer to data processing functionality that is deployed on a GPP. The term "firmware" will refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together"—somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

Alternatively, as will be described, the embodiments described below may be implemented using FPGA's or other reconfigurable logic. Implementing processing tasks and algorithms using an FPGA can yield significant performance enhancements over implementations using traditional microprocessors and operating systems. In particular, an FPGA-based system implementation may avoid the processing overhead and uncontrollable/unnecessary optimizations implemented by general purpose processors, compilers, operating systems and communications protocols, as well as the security vulnerabilities thereof. For example, an FPGA may avoid interrupt handling, error correction, pre-fetching and other unnecessary microprocessor operations/optimizations, as well as generic processing/housekeeping tasks of the operating system which are not needed, such as garbage collection, unnecessary memory swaps, cache loads, task switching, cycle stealing, etc. Further an FPGA implementation may avoid the use of general purpose compilers which may introduce, for example, undesired program code optimizations.

For example, using an FPGA-based implementation may permit components of the embodiments described above to be collocated, such as via a custom interface, or otherwise closely interconnected with networking equipment, such as a router or switch, e.g. via a backplane thereof. This would allow the disclosed embodiments to have access to incoming transactions as quickly as possible and avoid the latency introduced, not only by having to route the transaction over conventional networking media, but also by the communications protocols, e.g. Transport Control Protocol ("TCP"), used to perform that routing. One exemplary implementation is referred to as a "Smart Network Interface Controller" or "SmartNIC" which is a device which typically brings together high-speed network interfaces, a PCIe host interface, memory and an FPGA. The FPGA implements the NIC controller, acting as the bridge between the host computer and the network at the "physical layer" and allows user-designed custom processing logic to be integrated directly into the data path. This may allow a smart NIC to function as a programmable data processing platform under the supervision of a host CPU. Under the Open System Interconnection ("OSI") model, which is a conceptual model that characterizes and standardizes the internal functions of a communication system by partitioning it into abstraction layers, the physical abstraction layer defines electrical and physical specifications for devices. In particular, it defines the relationship between a device and a transmission medium, such as a copper or fiber optical cable. This includes the layout of pins, voltages, line impedance, cable specifications, signal timing, hubs, repeaters, network adapters, host bus adapters (HBA used in storage area networks) and more. The major functions and services performed by the physical layer include: establishment and termination of a connection to a communications medium; participation in the process whereby the communication resources are effectively shared among multiple users, for example, contention resolution and flow control; and modulation or conversion between the representation of digital data in user equipment and the corresponding signals transmitted over a communications channel, these signals operating over the physical cabling (such as copper and optical fiber) or over a radio link.

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media including, but not limited to random access memory, read-only memory, programmable read-only memory, electrically programmable read-only memory, electrically erasable read-only memory, flash memory, magnetic tape or disk, optical media and the like. In one embodiment, the memory 404 may be a memory component of a reconfigurable logic device, e.g. an FPGA. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disk ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component.

The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to, TCP/IP-based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data including, by way of example, a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disc or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application-specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical discs, or optical discs. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical discs; and CD ROM and DVD-ROM discs. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for validating a modified computer implemented transaction processing system using containerized application services, wherein the transaction processing system comprises a first microprocessor that implements a containerized application service connector that includes a transformer including executable software code executable by the first microprocessor that causes the transformer to process a plurality of incoming transactions, each comprising a data object containing data in a first format, and, for each of the plurality of incoming transactions, process each data object to convert the data therein from the first format to a second format based on a format specification and generate a processed output, the method comprising:

receiving, by a second microprocessor separate from the transaction processing system, a format modification to the format specification;

deploying, automatically, by the second microprocessor, into a containerized system, a first containerized application service connector including a first version of the transformer comprising the transformer prior to a modification, wherein the deploying of the first containerized application service connector including the first version of the transformer comprises instantiating an instance of the first containerized application service connector including the first version of the transformer;

deploying, automatically, by the second microprocessor into the containerized system, a second containerized application service connector including a second version of the transformer comprising the transformer as modified by the modification, wherein the deploying of the second containerized application service connector including the second version of the transformer comprises instantiating an instance of the second containerized application service connector including the second version of the transformer, wherein the deploying of the first containerized application service connector including the first version of the transformer occurs in parallel with the deploying of the second containerized application service connector including the second version of the transformer;

providing a database coupled with the second microprocessor and which stores copies of a plurality of historical transactions which include incoming transactions previously received and processed by the first version of the transformer which have previously produced valid results;

selecting, automatically by the second microprocessor, a subset of the plurality of historical transactions which have previously produced valid results stored in the database;

for each historical transaction of the selected subset of the plurality of historical transactions stored in the database:

causing, automatically by the second microprocessor, the first version of the transformer to re-process the historical transaction and generate, based thereon, a first re-processed output;

causing, automatically by the second microprocessor, the second version of the transformer to re-process the historical transaction and, based thereon, generate a second re-processed output, wherein the causing of the first version of the transformer to re-process the historical transaction and generate, based thereon, the first re-processed output occurs in parallel with the causing of the second version of the transformer to re-process the historical transaction and, based thereon, generate the second re-processed output;

comparing, automatically by the second microprocessor, the first re-processed output to the second re-processed output to identify any differences therebetween; and presenting, by the second microprocessor on a display coupled therewith, data indicative of the identified differences; and destroying, by the second microprocessor, the first and second containerized application service connectors.

2. The computer implemented method of claim 1, wherein the first microprocessor is one of a plurality of first microprocessors that implement a plurality of containerized application service connectors including a plurality of transformers that include executable software code executable by the plurality of first microprocessors that cause each transformer to process a specific subset of the plurality of incoming transactions, and which has processed a specific subset of the previously processed plurality of historical transactions stored in the database, and wherein the selecting further comprises selecting at least a portion of the specific subset of the previously processed plurality of historical transactions stored in the database processed by the transformer.

3. The computer implemented method of claim 1, further comprising providing a key specification file of expected differences between outputs of the first and second versions of the transformer based on the format modification, and wherein the comparing is further operative to ignore, based on the key specification file, any expected differences between the first and second re-processed outputs.

4. The computer implemented method of claim 3, further comprising determining, automatically by the second microprocessor, that the modification did not alter previously operational functionality of the transaction processing system when no non-ignored differences are identified.

5. The computer implemented method of claim 1, further comprising providing a key specification file of previously operational functionality of the transaction processing system to test and wherein the selecting of the subset of the plurality of historical transactions stored in the database is based thereon.

6. The computer implemented method of claim 1, wherein the processing of the historical transaction by the first and second versions of the transformer is performed for all of the selected subset of the plurality of historical transactions to generate an aggregate of the first and second re-processed outputs and store the aggregate first and second re-processed outputs in a memory coupled with the second microprocessor, the comparing further comprising retrieving the stored aggregate first and second re-processed outputs and subsequently comparing the aggregate first re-processed output to the aggregate second re-processed output to identify any differences therebetween.

7. The computer implemented method of claim 1, wherein the first format comprises one of a data file, text, email message, spreadsheet, csv, html, or xml.

8. The computer implemented method of claim 1, wherein the first and second formats define one of data fields, data types, or data format of the data of the data object.

9. The computer implemented method of claim 1, wherein the format modification comprises a modification to the format specification to cause the first microprocessor of the transaction processing system, when executing the executable software code of the transformer, to convert the data therein from the first format to a third format different from the second format.

10. The computer implemented method of claim 1, wherein the format modification comprises a modification to the format specification to cause the first microprocessor of the transaction processing system, when executing the executable software code of the transformer, to convert the data therein from a third format, different from the first format, to the second format.

11. The computer implemented method of claim 1, wherein the identified differences are presented within a context of similarities between the first and second re-processed outputs.

12. The computer implemented method of claim 11, wherein the identified differences are highlighted in the presentation.

13. A system for validating a modified computer implemented transaction processing system using containerized application services, wherein the transaction processing system comprises a first microprocessor that implements a containerized application service connector that includes a transformer including executable software code executable by the first microprocessor that causes the transformer to process a plurality of incoming transactions, each comprising a data object containing data in a first format, and, for each of the plurality of incoming transactions, process each data object to convert the data therein from the first format to a second format based on a format specification and generate a processed output, the system comprising:
  first logic stored in a memory and executable by a second microprocessor separate from the transaction processing system to cause the second microprocessor to receive a format modification to the format specification;
  second logic stored in the memory and executable by the second microprocessor to deploy, automatically, into a containerized system, a first containerized application service connector including a first version of the transformer comprising the transformer prior to a modification, wherein the deployment of the first containerized application service connector including the first version of the transformer comprises instantiation of an instance of the first containerized application service connector including the first version of the transformer;
  third logic stored in the memory and executable by the second microprocessor to cause the second microprocessor to deploy, automatically, into the containerized system, a second containerized application service connector including a second version of the transformer comprising the transformer as modified by the modification, wherein the deployment of the second version of the transformer comprises instantiation of an instance of the second containerized application service connector including the second version of the transformer, and wherein the second logic and the third logic are further executed by the second microprocessor to cause the deployment of the first version of the transformer in parallel with the deployment of the second version of the transformer;
  a database coupled with the second microprocessor and which stores copies of a plurality of historical transactions which include incoming transactions previously received and processed by the first version of the transformer of the transaction processing system which have previously produced valid results;
  fourth logic stored in the memory and executable by the second microprocessor to cause the second microprocessor to automatically select a subset of the plurality of historical transactions which have previously produced valid results stored in the database; and
  fifth logic stored in the memory and executable by the second microprocessor to cause the second microprocessor to, for each historical transaction of the selected subset of the plurality of historical transactions stored in the database:
    cause, automatically, the first version of the transformer to re-process the historical transaction and generate, based thereon, a first re-processed output;
    cause, automatically, the second version of the transformer to re-process the historical transaction and, based thereon, generate a second re-processed output, wherein the fifth logic is further executable by the second microprocessor to cause the first and second versions of the transformer to re-process the historical transaction in parallel;
    compare, automatically, the first re-process output to the second re-process output to identify any differences therebetween; and
    present, on a display coupled with the second microprocessor, data indicative of the identified differences; and
  sixth logic stored in the memory and executable by the second microprocessor to cause the second microprocessor to destroy the first and second containerized application service connectors.

14. The system of claim 13, wherein the first microprocessor is one of a plurality of first microprocessors that implement a plurality of containerized application service connectors including a plurality of transformers that include executable software code executable by the plurality of first microprocessors that cause each transformer to process a specific subset of the plurality of incoming transactions, and which has processed a specific subset of the previously processed plurality of historical transactions stored in the database, and wherein the fourth logic is further executable by the second microprocessor to cause the second microprocessor to select at least a portion of the specific subset of the previously processed plurality of historical transactions stored in the database processed by the transformer.

15. The system of claim 13, further comprising sixth logic stored in the memory and executable by the second microprocessor to cause the second microprocessor to receive a key specification file of expected differences between outputs of the first and second versions of the transformer based on the format modification, and wherein the fifth logic is further executable by the second microprocessor to cause the second microprocessor to ignore, based on the key specification file, any expected differences between the first and second re-processed outputs.

16. The system of claim 15, wherein the fifth logic is further executable by the second microprocessor to cause the second microprocessor to automatically determine that the format modification and the modification to the transformer in response to the format modification did not alter previously operational functionality of the transaction processing system when no non-ignored differences are identified.

17. The system of claim 13, further comprising sixth logic stored in the memory and executable by the second microprocessor to cause the second microprocessor to receive a key specification file of previously operational functionality of the transaction processing system to test and wherein the fourth logic is further executable by the second microprocessor to cause the second microprocessor to select the subset of the plurality of historical transactions stored in the database based thereon.

18. The system of claim 13, wherein the fifth logic is further executable by the second microprocessor to cause the second microprocessor to cause the first and second versions of the transformer to process all of the selected subset of the plurality of historical transactions and to generate an aggregate of the first and second re-processed outputs and store the aggregate first and second re-processed outputs in the memory coupled with the second microprocessor, the comparing further comprising retrieving the stored aggregate first and second re-processed outputs and subsequently comparing the aggregate first re-processed output to the aggregate second re-processed output to identify any differences therebetween.

19. The system of claim 13, wherein the first format comprises one of a data file, text, email message, spreadsheet, csv, html, or xml.

20. The system of claim 13, wherein the first and second formats define one of data fields, data types, or data format of the data of the data object.

21. The system of claim 13, wherein the format modification comprises a modification to the format specification to cause the first microprocessor, during execution of the executable software code of the transformer, to convert the data therein from the first format to a third format different from the second format.

22. The system of claim 13, wherein the format modification comprises a modification to the format specification to cause the first microprocessor, during execution of the executable software code of the transformer, to convert the data therein from a third format, different from the first format, to the second format.

23. The system of claim 13, wherein the identified differences are presented within a context of similarities between the first and second re-processed outputs.

24. The system of claim 23, wherein the identified differences are highlighted in the presentation.

25. A system for validating a modified computer implemented transaction processing system using regression testing, wherein the transaction processing system comprises a first microprocessor that implements a containerized application service connector that includes a transformer including executable software code executable by the first microprocessor that causes the transformer to process a plurality of incoming transactions, each comprising a data object containing data in a first format, and, for each of the plurality of incoming transactions, process each data object to convert the data therein from the first format to a second format based on a format specification and generate a processed output, the system comprising:

a regression dispatcher implemented by a second microprocessor separate from the transaction processing system, operative to receive a format modification to the format specification, to deploy, automatically, into a containerized system, a first containerized application service connector including a first version of the transformer comprising the transformer prior to a modification, deploy, into the containerized system, a second containerized application service connector including a second version of the transformer comprising the transformer as modified by the modification, and automatically select a subset of a plurality of historical transactions stored in a database which stores copies of a plurality of historical transactions which include incoming transactions previously received and processed by the first version of the transformer which have previously produced valid results, wherein the regression dispatcher causes the deployment of the first containerized application service connector including the first version of the transformer in parallel with the deployment of the second containerized application service connector including the second version of the transformer, wherein the deployment of the first containerized application service connector including the first version of the transformer comprises instantiation of an instance of the first containerized application service connector including the first version of the transformer, and wherein the deployment of the second containerized application service connector including the second version of the transformer comprises instantiation of an instance of the second containerized application service connector including the second version of the transformer; and a comparator implemented by the second microprocessor and coupled with the regression dispatcher and operative to, for each historical transaction of the selected subset:

cause, automatically, the first version of the transformer to re-process the historical transaction and generate, based thereon, a first re-processed output;

cause, automatically, the second version of the transformer to re-process the historical transaction and, based thereon, generate a second re-processed output, wherein the comparator causes the first and second versions of the transformer to re-process the historical transaction in parallel;

compare, automatically, the first re-processed output to the second re-processed output to identify any differences therebetween; and present, on a display coupled with the second microprocessor, data indicative of the identified differences; and destroy the first and second containerized application service connectors.

* * * * *